United States Patent
Coutts et al.

[19]

[11] Patent Number: 5,835,603
[45] Date of Patent: Nov. 10, 1998

[54] FINANCIAL TRANSACTION SYSTEM

[75] Inventors: Michael G. Coutts, Birkhill; Lee G. Dove, Coupar Angus, both of Scotland

[73] Assignee: NCR Corporation, Dayton, Ohio

[21] Appl. No.: 717,873

[22] Filed: Sep. 23, 1996

[30] Foreign Application Priority Data

May 21, 1996 [GB] United Kingdom ............... 9610645

[51] Int. Cl.⁶ ........................... H04L 9/00; G07F 19/00
[52] U.S. Cl. .............................. 380/49; 380/9; 380/23; 380/24; 380/25; 380/50; 380/59; 705/35; 705/39; 705/42
[58] Field of Search ........................... 380/4, 9, 23, 24, 380/25, 49, 50, 59; 705/35, 36, 37, 38, 39, 40, 41, 42, 44

[56] References Cited

U.S. PATENT DOCUMENTS 4,536,647  8/1985  Atalla et al. ...................... 380/24
5,025,373  6/1991  Keyser, Jr. et al. ................ 380/24 X
5,220,501  6/1993  Lawlor et al. ..................... 380/24

OTHER PUBLICATIONS

"Home Banking Growth In Poularity"; Two–Ten Communications Ltd., 1995; posted on the Internet at http://www.t-woten.press.net/stories/97/01/30/headlines/Survey_Banking_Home.html.

*Primary Examiner*—Bernard E. Gregory

[57] ABSTRACT

A home banking system comprises a video games entertainment console 10 having a processor 12, a display driver 14, connection means 16 for connection to a television set 17, and an input/output device 20. Such a conventional console 10 is converted to a home banking terminal by an encrypting modem 24 connected into the cartridge slot 26 of the console 10, the encrypting modem having a cartridge slot 30 into which an application cartridge 32 carrying a home banking program can be loaded.

2 Claims, 4 Drawing Sheets

SYMMETRIC ENCRYPTION

ASYMMETRIC ENCRYPTION

FINANCIAL TRANSACTION SYSTEM

BACKGROUND OF THE INVENTION

This invention relates to a financial transaction system, and relates especially to a home banking system.

It is known to provide home banking facilities and insurance services by telephone. Home banking terminals are based either on dedicated equipment, specific to a particular bank, or on personal computers, which are relatively expensive items.

A major practical problem in financial transactions over the telephone network is the risk of theft of valuable customer information as data passes between a financial institution and a customer.

SUMMARY OF THE INVENTION

It is an object of the invention to provide a home banking system, based on easily available equipment and with a low risk of loss of customer data.

According to the invention there is provided a home banking system including visual display means, characterized by a functional unit which includes data processor means and which is connectable to said visual display means and is adapted to perform at least one predetermined function other than a home banking function, and converter means detachably connectable to said functional unit for the purpose of converting said functional unit to operate as a home banking terminal, said converting means including data storage means having a home banking program stored therein, encrypting means, and modem means arranged to connect the functional unit to a public communications network via the encrypting means.

Preferably the functional unit comprises an entertainment console such as the type used to play video games in a home environment. In such a unit, the means to load a home banking program may comprise either a cartridge slot or a compact disc drive or a smart card reader.

The modem means may connect the functional unit either to the PSTN (Public Switched Telephone Network) or to a cable television network.

When the console comprises an entertainment console, the display means may comprise a domestic television set.

It is an advantage of the use of an entertainment console that such consoles are widely available and relatively inexpensive.

BRIEF DESCRIPTION OF THE DRAWING

Embodiments of the invention will now be described by way of example only with reference to the accompanying drawings, in which.

DETAILED DESCRIPTION

Figure 1:
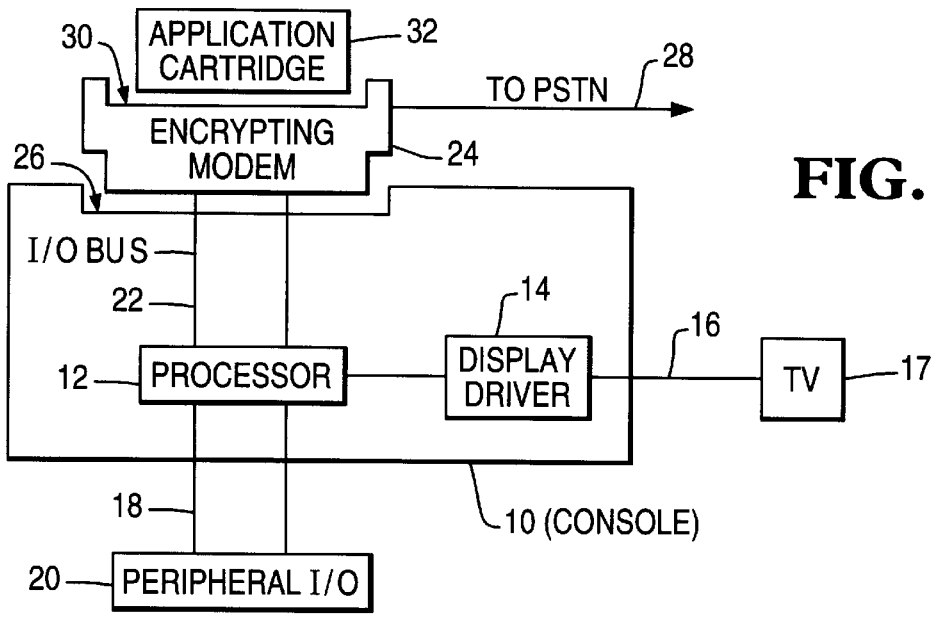
FIG. 1 illustrates a first embodiment of a home banking system based on an entertainment console.

In FIG. 1, a home banking user terminal comprises an entertainment console 10 normally used for playing video games in the home. The console has a processor 12 connected through a display driver 14 to connection means 16 to connect the console 10 to a domestic television set 17. The processor 12 is also connected through a peripheral bus 18 to a peripheral input/output device 20, which may be a joy pad. In known manner a joy pad has a raised surface enabling a user to selectively operate any one of four keys disposed beneath the raised surface. The processor 12 is further connected by an input/output bus 22 to a cartridge slot 26. Such a console is conventional.

In a home banking system according to the invention, an encrypting modem 24 is connected into the cartridge slot 26, and can be regarded as an extension of the address space of the processor 12. The encrypting modem 24 is also provided with connection means 28 to connect the modem to the PSTN. Alternatively, the modem 24 may be connected to a cable television network.

The encrypting modem 24 is provided with an application cartridge slot 30, and an application cartridge 32 can be loaded into the slot 30; the cartridge 32 may carry a record of all information required for a home banking service. Thus, it will be appreciated that the encrypting modem 24 and the application cartridge together form converting means for converting the console 10 to operate as a home banking terminal.

In use, a user purchases an application cartridge 32, for example from the user's bank or authorized supplier, and, for a first use, an appropriate encrypting modem 24 suitable for connection to the architecture of the console. The user loads the cartridge 32 into the slot 30 in the encrypting modem 24, connects the PSTN connection 28 to the encrypting modem 24, and loads the encrypting modem 24 into the slot 26 in the console 10. The user then views the appropriate displays provided on the screen of the television set 17, and enters the required data into the processor 12 through the input/output device 20. Such data will include the user's identification, e.g. PIN (Personal Identification Number), and authorization information, as is required in currently available home banking terminals. The processor 12 then provides instructions so that the requested home banking network is automatically dialed by the modem 24 and the PSTN. A user can for example then request the current status of the user's bank account, which is down-loaded to the console 10. The user may also perform banking transactions, such as paying bills and transferring funds between accounts, the user instructing action by the home banking network via the modem 24. All data passing through the PSTN is encrypted.

It is an advantage of such an arrangement that the home banking service can be provided over the PSTN using a widely-available and reasonably priced item of hardware, i.e., the entertainment console 10, rather than by the provision of a dedicated terminal in the user's home. All the required information can be provided in the application cartridge.

Figure 2:
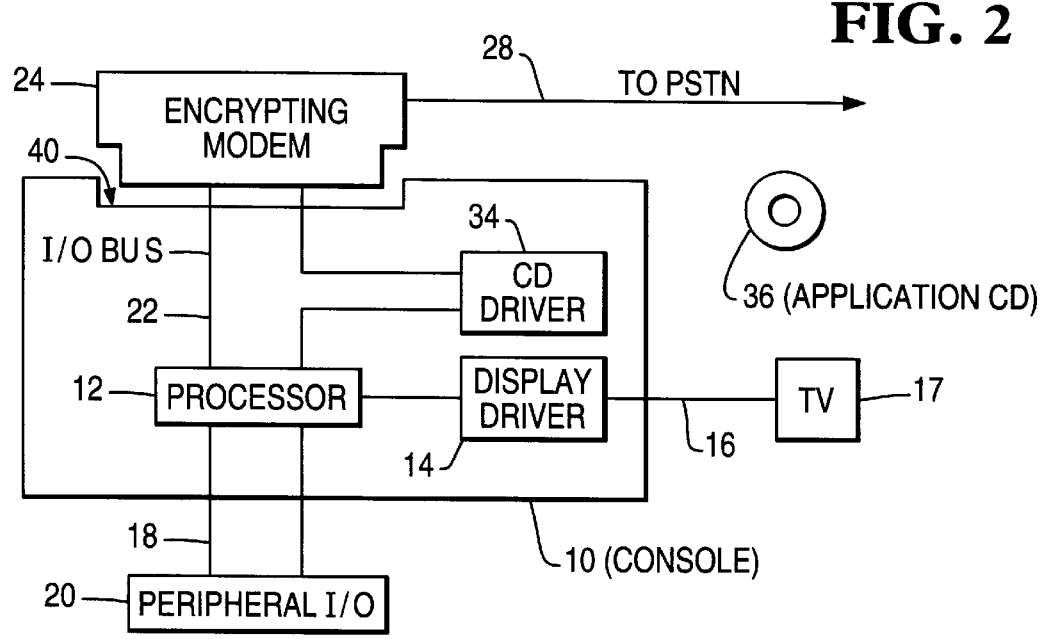
FIG. 2 illustrates an alternative embodiment also based on an entertainment console.

In the alternative arrangement of FIG. 2, parts of the equipment identical to those in FIG. 1 are given identical reference numerals. The console 10 is provided with a CD drive 34 into which a CD 36 may be loaded. The encrypting modem 24 is inserted into the cartridge slot 40 which is made available on a CD-based entertainment console for the provision of hardware extensions, back up memory systems etc. The modem 24 may optionally still be provided with a slot (not shown in FIG. 2) to allow such hardware extensions to be used in combination with the encrypting modem 24.

The application information is now provided by the CD 36, operation of the console 10 being otherwise identical to that described with reference to FIG. 1. In this embodiment the encrypting modem 24 and the CD 36 form the converting means for converting the console 10 to operate as a home banking terminal.

Figure 3:
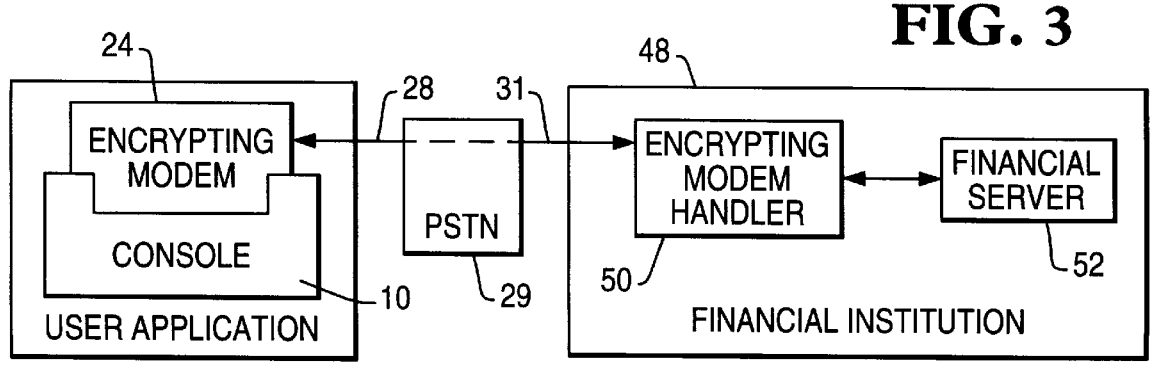
FIG. 3 is a schematic diagram of a home banking system, showing also a bank terminal.

FIG. 3 illustrates the overall home banking system. The user application is run by the console 10, and data is supplied to the PSTN connection 28 through the encrypting modem 24. The PSTN 29 carries the encrypted data to the financial institution network indicated schematically at reference 48, through a connection 31. The encrypted data is received by an encryption modem handler 50 connected to a financial server 52. The requested information is accessed and supplied to the user by the reverse route, and requested transactions are processed similarly by the network.

An essential feature of the invention is the use of encryption techniques so that information passing between the user and the bank network over the PSTN 29 (or through a cable television network) is protected from attack and theft to a high level of security.

Entertainment consoles such as 10 contain a processor 12 which typically varies from an 8-bit to a 64-bit processor. In general processors of entertainment consoles are sufficiently powerful to support encryption. Any encryption scheme can be used, provided it is compatible with the least powerful processor which may access it; therefore the encryption scheme must be agreed in advance, and compatible entertainment consoles specified if high powered encryption is applied.

A known encryption/decryption algorithm such as RSA encryption or DES encryption may be selected. An encryption key is a fixed length bit sequence, typically 40 or 64 bits; the longer the key, the harder the encryption is to break.

Figure 4A:
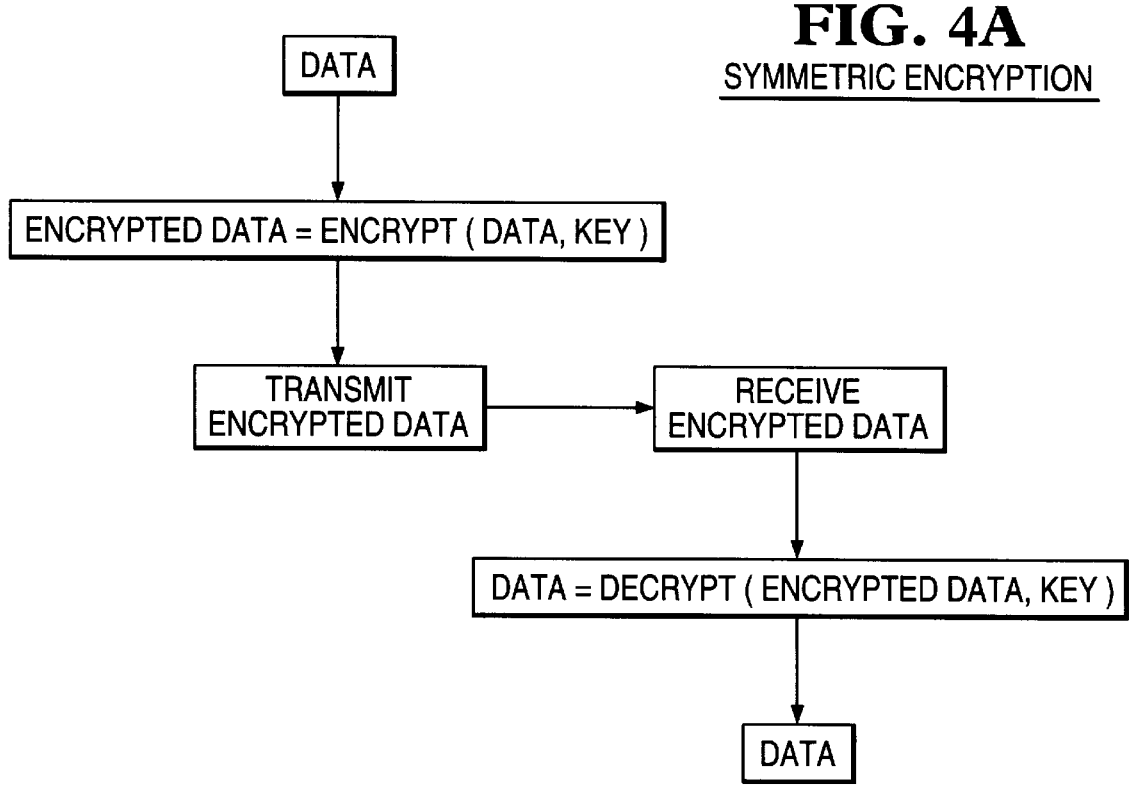
FIGS. 4a and 4b illustrate two arrangements for, respectively, symmetric and asymmetric encryption.
Figure 4B:
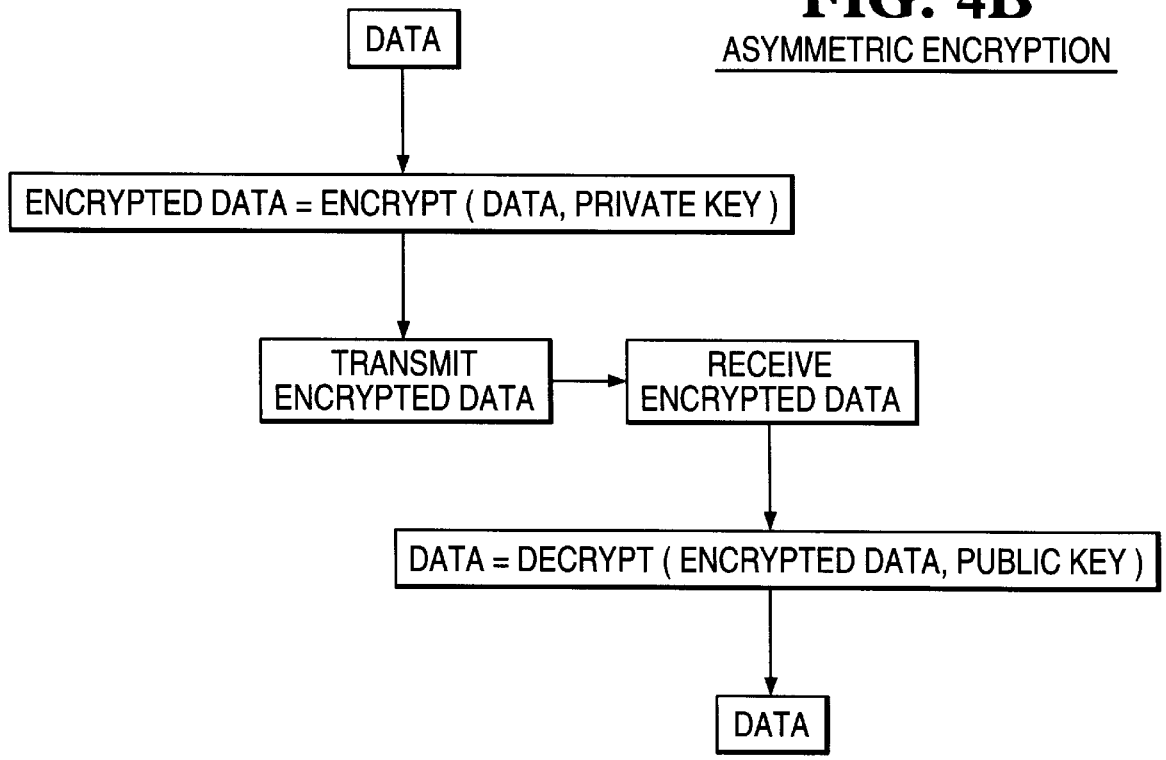

Two types of encrypted data transmission are shown in FIG. 4; in the symmetric arrangement of FIG. 4a the same key is used to encrypt and decrypt the message. In the asymmetrical encryption process shown in FIG. 4b, different keys are used for encryption and decryption as illustrated; a private key known only to one end is used to encrypt the message while a public key known to both ends is used to decrypt the message. Such techniques are well-known.

The selected algorithm can be implemented within the encrypting modem 24 either within the physical hardware or as a software solution within the device, or it may be driven by the user application; the decrypting algorithm is driven by the modem handler 50 (FIG. 3).

Figure 5A:
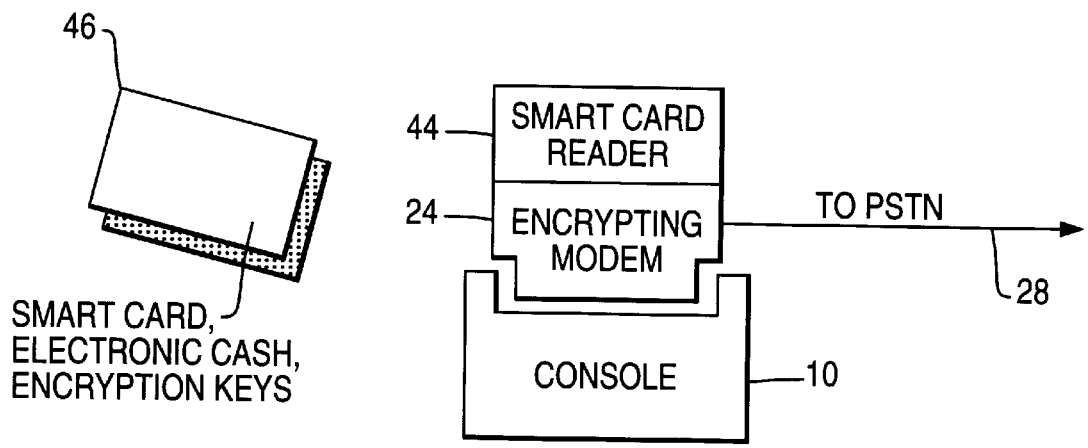
FIG. 5a illustrates an embodiment based on a smart card reader and FIG. 5b shows the data flow.
Figure 5B:
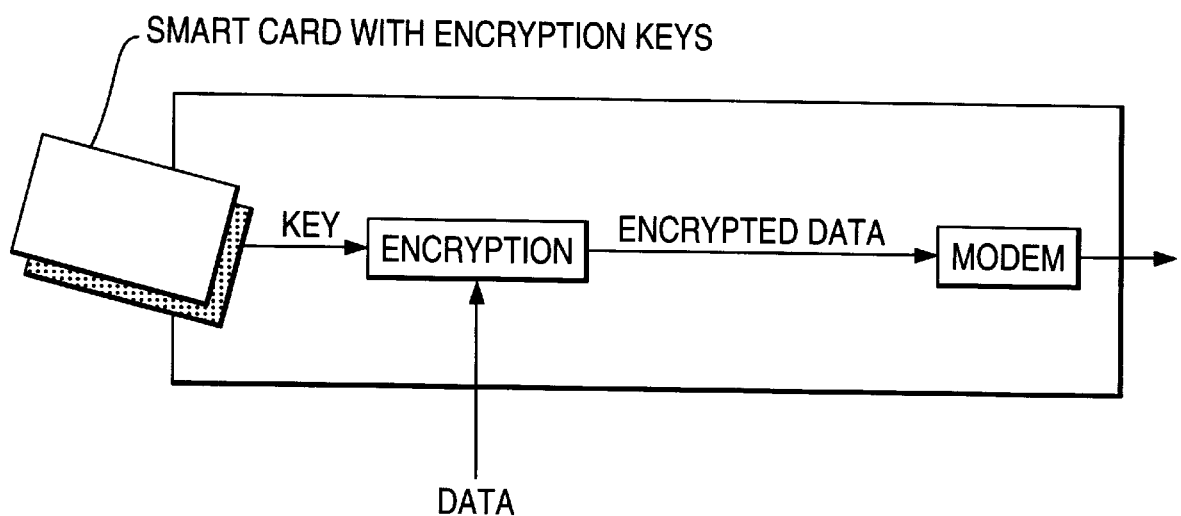

FIG. 5a illustrates a third embodiment in which the console 10 is supplied with an encrypting modem 24 which has a smart card reader 44 for reading a smart card 46. In this arrangement, the user has the option of transferring funds to the smart card 46, i.e. electronic cash can be provided. FIG. 5b illustrates the operation. The smart card 46 provides user-specific information to the home banking application running on the console 10, and also supplies the user's encryption keys to the encrypting modem 24 for use in the encryption and decryption of data transmitted over the PSTN. In this embodiment, the combination of the encrypting modem 24, the smart card reader 44 and the smart card 46 form the converting means for converting the console 10 to operate as a home banking terminal.

Figure 6A:
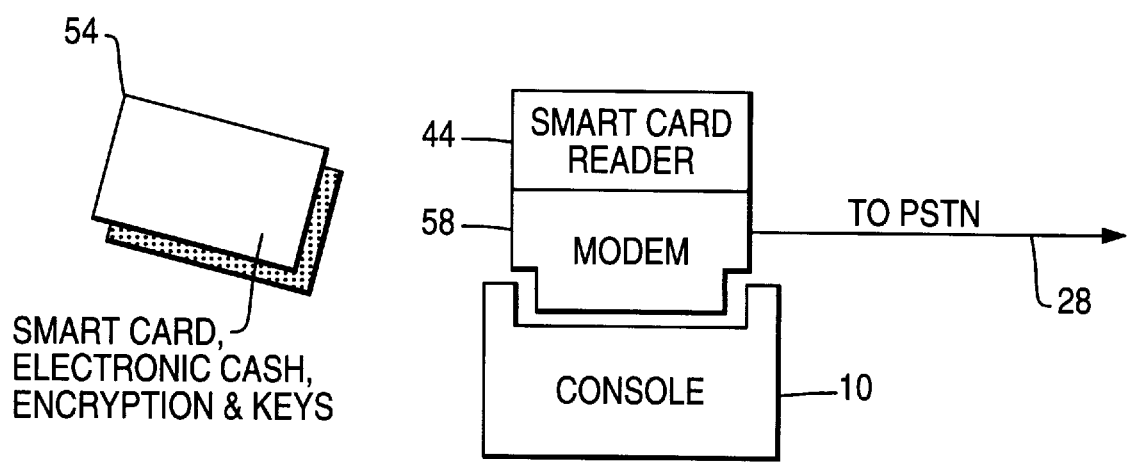
FIG. 6a illustrates an alternative smart card-based arrangement.
Figure 6B:
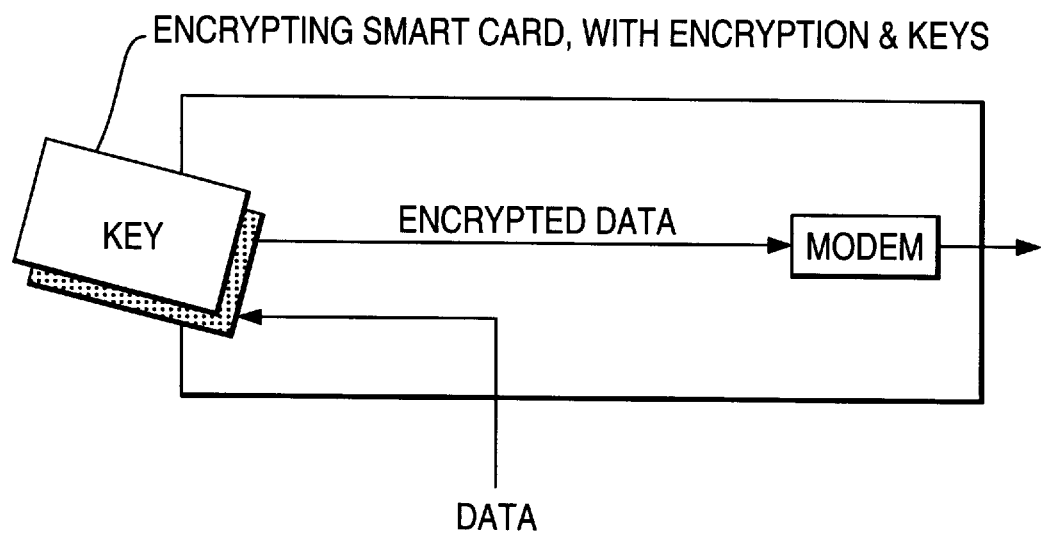
FIG. 6b shows the data flow.

A smart card may also provide the encryption algorithm. The arrangement shown in FIG. 6a would then be possible. The console 10 is provided with a smart card reader 44 and a conventional, non-encrypting modem 58. A smart card 54 carrying an encryption key and an encrypt/decrypt facility is connected to the card reader 44. Encrypted data is passed to the modem 58 which sends the encrypted information over the PSTN. The card 54 also decrypts received data, and passes it to the console 10 via the card reader 44.

The smart card 54 is now equivalent to the encryption and key storage facility of the encrypting modem 24 in earlier embodiments. Such an arrangement has the advantage that users can carry their personal keys within the smart card, so that the full range of home banking services can be accessed from any console capable of reading a smart card. The same smart card may also be usable within an ATM (Automated Teller Machine) or other self service banking terminal.

What is claimed is:

1. An apparatus comprising:

a display;

an entertainment console for performing at least one predetermined function other than a banking function, the entertainment console including (i) a display driver connected to the display, and (ii) a processor connected to the display driver and for controlling the display driver to control the display;

an encrypting modem connected to the processor and including (i) means defining a slot for receiving an application cartridge having a home banking program stored thereon, and (ii) means for connecting the processor to a public communications network to allow a user at the entertainment console to carry out a desired banking function when an application cartridge having a home bank program stored thereon is received in the slot; and an input device connected to the processor and for allowing a user at the entertainment console to enter data relating to a desired banking function and thereby to allow the user to carry out the desired banking function.

2. An apparatus comprising:

a display;

an entertainment console for performing at least one predetermined function other than a banking function, the entertainment console including (i) a display driver connected to the display, and (ii) a processor connected to the display driver and for controlling the display driver to control the display;

a smart card reader including means defining a slot for receiving from a user at the entertainment console a smart card having a home bank program stored thereon;

a modem connected between the processor and the smart card reader and including means for connecting the processor to a public communications network to allow a user at the entertainment console to carry out a desired banking function when a smart card having a home bank program stored thereon is received in the slot of the smart card reader; and an input device connected to the processor and for allowing a user at the entertainment console to enter data relating to a desired banking function and thereby to allow the user to carry out the desired banking function.

* * * * *